US006276841B1

(12) United States Patent
Demangone

(10) Patent No.: US 6,276,841 B1
(45) Date of Patent: Aug. 21, 2001

(54) CONNECTOR WITH LOW-PROFILE LATCH

(75) Inventor: Drew A. Demangone, Latrobe, PA (US)

(73) Assignee: Berg Technology, Inc., Reno, NV (US)

( * ) Notice: Subject to any disclaimer, the term of this patent is extended or adjusted under 35 U.S.C. 154(b) by 0 days.

(21) Appl. No.: 09/420,754

(22) Filed: Oct. 20, 1999

(51) Int. Cl.[7] ........................ G02B 6/36

(52) U.S. Cl. ........................ 385/76; 385/53; 385/55; 439/352; 439/350

(58) Field of Search ........................ 385/76, 53, 60, 385/64, 59, 55, 56; 439/352, 157, 357, 610, 701, 350, 351, 353, 354, 355, 356, 358

(56) References Cited

U.S. PATENT DOCUMENTS

| | | | |
|---|---|---|---|
| Re. 34,430 | 11/1993 | Mosquera et al. | 439/248 |
| 4,458,973 | 7/1984 | Hayes et al. | 339/91 R |
| 4,818,058 | 4/1989 | Bonanni | 350/96.2 |
| 5,528,711 | 6/1996 | Iwano et al. | 385/56 |
| 5,529,514 | 6/1996 | Gargiulo | 439/567 |
| 5,530,783 | 6/1996 | Belopolsky et al. | 385/53 |
| 5,579,425 | 11/1996 | Lampert et al. | 385/59 |
| 5,613,870 | 3/1997 | Traver, Jr. | 439/352 |
| 5,895,284 | 4/1999 | Kocher et al. | 439/357 |
| 6,113,429 * | 9/2000 | Weigel et al. | 439/610 |

FOREIGN PATENT DOCUMENTS

| | | |
|---|---|---|
| 2 669 897 | 6/1992 | (FR) . |
| 2 776 844 | 10/1999 | (FR) . |

* cited by examiner

*Primary Examiner*—Phan T. H. Palmer
(74) *Attorney, Agent, or Firm*—Woodcock Washburn Kurtz Mackiewicz & Norris LLP

(57) ABSTRACT

A connector couples with a mating component and has a main body and a generally planar latch. The main body is insertable into the mating component in a coupling direction, and has a face generally parallel to the coupling direction. The latch is resiliently coupled to the main body at the face thereof, and is generally parallel to the face. The latch includes a latching surface for cooperating with a latch-catch of the mating component, and is resiliently actuatable in the plane thereof. Accordingly, the latching surface is released from the latch-catch of the mating component. In one embodiment of the present invention, a pair of the connectors each couple with a respective mating component.

27 Claims, 1 Drawing Sheet

CONNECTOR WITH LOW-PROFILE LATCH

FIELD OF THE INVENTION

The present invention relates to a connector such as an electrical connector or an optical connector, and more particularly to such a connector having a low-profile latch structure.

BACKGROUND OF THE INVENTION

In various kinds of connectors, including optical connectors and electrical connectors, it is known to include a latching device, latch structure, or simply a latch for interlocking with an appropriate latch-catch on a corresponding mating component such as another connector. For example, in a typical 'RJ-type' plug connector, a latching tab is resiliently coupled to and extends from one lateral face of the main body of the plug connector, and includes the aforementioned latch which co-acts with an appropriate latch-catch in a corresponding receptacle connector. Typically, the latching tab extends perpendicularly away from the main body somewhat and is actuated by being pushed generally perpendicularly and toward the lateral face of the main body during removal of the plug connector from the outlet connector.

However, such a connector with a perpendicular latching tab suffers a disadvantage in situations where the connector and the mating connector must or should have a low profile. That is, the perpendicular latching tab in such connector requires a minimum amount of clearance in the extending direction to allow for actuation, and such minimum amount of clearance in turn requires the corresponding mating connector to have a relatively larger profile in the same direction. As may be appreciated, a smaller, low profile is necessary and/or desirable in certain design situations, for example when the device to which the mating connector is attached has a relatively small surface area available for such mating connector, or is physically too thin to accommodate a larger profile mating connector.

Accordingly, a need exists for a latch for a connector wherein the connector and the mating connector can both have a relatively low profile.

SUMMARY OF THE INVENTION

In the present invention, a connector such as a modular plug couples with a mating component and has a main body and a generally planar latch. The main body is insertable into the mating component in a coupling direction, and has a face generally parallel to the coupling direction. The latch is resiliently coupled to the main body at the face thereof, and is generally parallel to the face. The latch includes a latching surface for cooperating with a latch-catch of the mating component, ans is resiliently actuatable in the plane thereof. Accordingly, the latching surface is released from the latch-catch of the mating component. In one embodiment of the present invention, a pair of the connectors each couple with a respective mating component.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
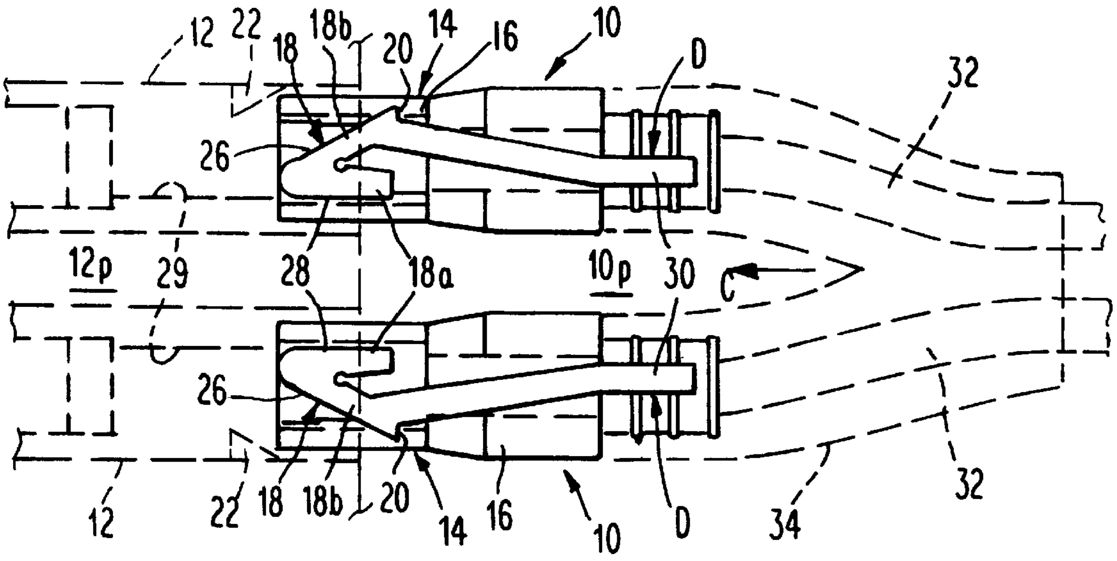
FIG. 1 is a top plan view of a pair of connectors in accordance with one embodiment of the present invention.

Certain terminology may be used in the following description for convenience only and is not considered to be limiting. The words "left", "right", "upper", and "lower" designate directions in the drawings to which reference is made. The words "inwardly" and "outwardly" are further directions toward and away from, respectively, the geometric center of the referenced object. The words "vertical" and "horizontal" in the present application designate orientations with respect to an object when such object is positioned in a particular and/or customary manner, but do not restrict the present invention to the object in such position. The terminology includes the words above specifically mentioned, derivatives thereof, and words of similar import.

Figure 2:
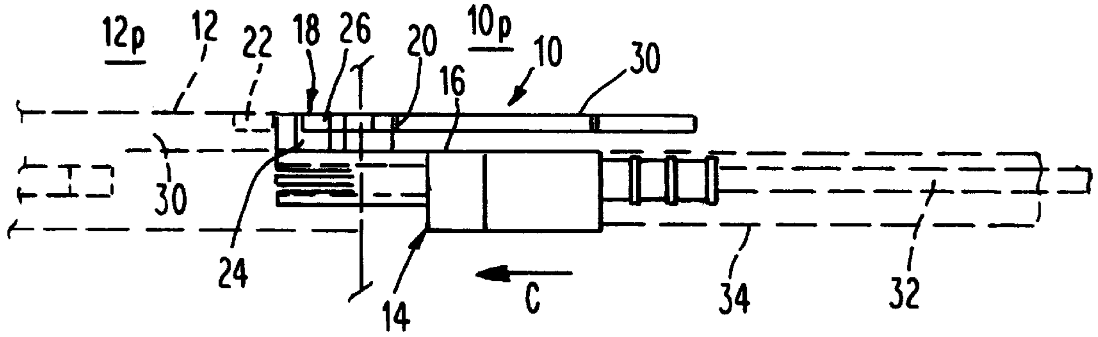
FIG. 2 is a side plan view of the connectors of FIG. 1.
Figure 3:
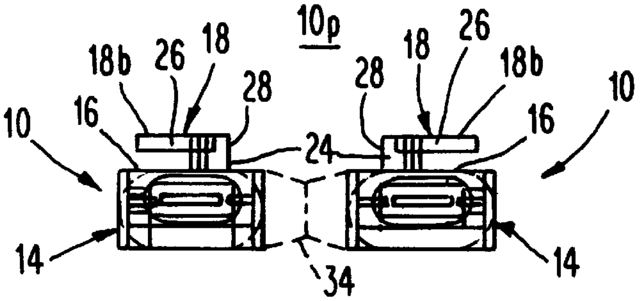
FIG. 3 is a front plan view of the connectors of FIG. 1.

Referring now to FIGS. 1–3, wherein like numerals are used to indicate like elements throughout, a pair **10*p* of connectors 10 is shown in accordance with one embodiment of the present invention. As may be appreciated, each connector 10 in the pair is designed to be coupled with a respective mating connector or component 12 from a pair 12*p* of such mating connectors 12. Such connectors 10 and mating connectors 12 may be of any type and have any particular design without departing from the spirit and scope of the present invention. For example, the connectors 10 and mating connectors 12 may be for making electrical, optical, hydraulic, or pneumatic connections, among other things. In addition, each connector 10 may have single or multiple numbers of channels (i.e., wires, fibers, pipes, tubes, etc.), and the channels may be arranged in any configuration (single row, N×M array, etc. The channels in one connector 10 of the pair 10*p* may define a path (e.g., for the flow of information) in one direction, while the channels in the other connector 10 of the pair 10*p* define a path in the opposite direction. Alternatively, the channels in each connector 10 of the pair 10*p*** may define paths in both directions.

Each connector 10 includes a main body 14 that is to be inserted into an appropriately configured aperture 16 defined by the respective mating connector 12. As shown, such insertion takes place in a coupling direction indicated in the drawings by the arrow C. The main body 14 may have several features, including for example aligning features such as bevels and abutting surfaces and/or pins and apertures, and keying features such as ridges and valleys. Importantly, the main body 14 includes the aforementioned channels therein, and ensures that such channels are appropriately positioned and held in place in the mating connector 12 when the connector 10 is coupled to such mating connector 12. For example, in the case of an optical connector 10, the main body 14 ensures that the ends of one or more optical fibers therein (not shown) are appropriately aligned with the ends of corresponding optical fibers (not shown) in the mating connector 12. U.S. Pat. Nos. 4,818,058 and B1 4,818,058, hereby incorporated by reference, describe one method of assembling optical fibers in a ferrule of an optical connector, although other methods may be employed without departig from the spirit and scope of the present invention.

In one embodiment of the present invention, each main body 14 has a lateral face 16 with a planar extent that is generally parallel to the coupling direction, and a generally planar latch body 18 is resiliently coupled to the main body 14 at the lateral face 16 thereof. As may be appreciated, the lateral face 16 need not necessarily be devoid of any features, such as ridges, bevels, etc., and in fact may have such features without departing from the spirit and scope of the present invention. Moreover, the lateral face 16 need only be parallel enough with the coupling direction such that the aligning and keying functions discussed above (if any are indeed present) and the latching functions to be discussed below are achieved. That is, 'generally parallel' in the context of the lateral face 16 of the present invention may in fact an angle of 5 or 10 degrees or perhaps more. Latch body 18 may resemble a typical RJ-type latching arrangement, although with the differences as discussed below.

As shown, in the present invention, each latch body 18 has a planar extent that is generally parallel to the lateral face 16. That is, the majority if not entirety of the latch body 18 resides generally in a plane that is generally parallel to the lateral face 16. In one embodiment of the present invention, the latch body 18 includes a generally fixed leg 18*a* coupled to the main body 14 and an actuatable leg 18*b* resiliently coupled to the fixed leg 18*a* at a resilient juncture. As shown, an offset body 24 may be interposed between the main body 14 and the latch body 18 to offset such latch body 18 from such main body 14. Such offset body 24 may generally follow the fixed leg 18*a* of the latch body 18 in contour in order to in fact fix the fixed leg 18*a* to the main body 14, or may have another shape in contour without departing from the spirit and scope of the present invention. The offset and the offset body 24, while necessary to ensure that the actuatable leg 18*b* has clearance from the main body 14 during actuation, does create a 'vertical' profile of the connector 10 of the present invention. Nevertheless, it is to be appreciated that such vertical profile is smaller than in a corresponding conventional perpendicular latch connector while providing the same retention force.

Importantly, the latch body 18 includes a latching surface 20 for cooperating with a latch-catch 22 of the mating connector 12. As shown, the latching surface 20 is on the outside lateral edge of the actuatable leg 18*b*, and faces in a direction generally opposite the coupling direction. Accordingly, such latching surface 20 when cooperating with the latch-catch 22 resists efforts to remove the connector 10 from the mating connector 12 unless the latch body 18 is actuated to release the latching surface 20 from the latch-catch 22. As should be appreciated from the drawings, in a latched position, the latching surface 20 faces and is in contact with an interior-facing surface of the latch-catch 22.

In one embodiment of the present invention, each latch body 18 has an initially contacting surface 26 adjacent the latching surface 20, where such initially contacting surface 26 faces at an acute angle with respect to the coupling direction. Such facing acute angle may for example be about 60 degrees, so that the surface 26 itself extends at about 150 degrees with respect to such coupling direction. Of course other angles may be employed without departing from the spirit and scope of the present invention. As should be appreciated, such initially contacting surface 26 initially contacts the mating connector 12 adjacent the latch-catch 22 thereof during coupling of the connector 10 with such mating connector 12.

In particular, and as should be appreciated from the drawings, during such initial contact, the initially contacting surface 26 faces and is in contact with an exteriorfacing surface of the latch-catch 22, where such exterior-facing surface may reside at a complementary angle with respect to the initially contacting surface 26. Accordingly, such contact and further movement of the connector 10 in the coupling direction cause the initially contacting surface 26 to cam against the exterior-facing surface of the latch-catch 22. As a result, the actuatable leg 18*b* of the latch body 18 resiliently deflects against the latch-catch 22 until the initially contacting surface 26 clears the exterior-facing surface of the latch-catch 22, at which point the actuatable leg 18*b* of the latch body 18 springs back to allow the latching surface 20 thereof to be brought into cooperating contact with the interior-facing surface of the latch-catch 22. Although the exterior-facing surface of the latch-catch 22 is shown as being tapered, other shapes may be employed without departing from the spirit and scope of the present invention.

In one embodiment of the present invention (not shown), each latch body 18 could utilize two actuatable legs 18*b* rather than one actuatable leg 18*b*. During deflection, each actuatable leg 18*b* opposes the forces created by the other actuatable leg 18*b*. In another embodiment of the present invention, each latch body 18 is independent of the other latch body 18. That is, during deflection of each latch body 18, the other latch body 18 is not expected to oppose forces exerted by such deflection. In the latter embodiment, each latch body 18 may include an opposing surface 28 generally laterally opposite the latching surface 20 and the initially contacting surface 26. As shown, such opposing surface 28 is on the outside lateral edge of the fixed leg 18*a*, although such surface 28 may be located elsewhere without departing from the spirit and scope of the present invention. As may be appreciated, such opposing surface 28 cooperates with a corresponding surface 29 on the mating connector 12 to oppose the aforementioned deflecting forces experienced by the latch body 18 during resilient deflection thereof. Also, during coupling of the connector 10 with the mating connector 12, the opposing surface 28 and the corresponding surface 29 cooperate to assist in aligning the connector with the mating connector 12, and in guiding such connector 10 into such mating connector 12. Alternatively, the fixed leg 18*a* could be replaced by another actuatable leg 18*b* (not shown). Notably, because each latch body 18 may be independent of the other latch body 18, each connector 10 in the drawings may be employed independently of and without the presence of the other connector 10 without departing from the spirit and scope of the present invention.

Once each connector 10 has been coupled to its respective mating connector 12 in the manner set forth above, it will likely become necessary at some point in time to de-couple such connector 10 and mating connector 12. Accordingly, and as shown in the drawings, a latch lever 30 is coupled to the latch body 18 to resiliently actuate such latch body 18 in the plane thereof, thereby releasing the latching surface 20 from the latch-catch 22 of the mating connector. Specifically, the latch lever 30 extends in a direction generally opposite the coupling direction from the actuatable leg 18*b* of the latch body 18. Accordingly, such latch lever 30 is accessible by hand even when the connector 10 is coupled to the mating connector 12. In one embodiment of the present invention, the latch lever 30 extends generally in the plane of the latch body 18 and adjacent the lateral face 16 of the main body 14. Thus, the latch lever 30 continues the relatively low profile of the connector 10. Such latch lever 30 nevertheless may extend out of such plane and away from the main body 14 of the connector 10 without departing from the spirit and scope of the present invention.

As should be appreciated, to de-couple each connector 10 from the mating connector 12, pressure is exerted on the latch lever 30 thereof in a direction generally parallel to the plane of the latch body 18 such that the actuatable leg 18*b* of the latch body 18 is moved toward the fixed leg 18*a* thereof (i.e., in the direction of arrow D in the drawings). Accordingly, the latching surface 20 on the actuatable leg 18*b* clears the interior-facing surface of the latch-catch 22, and the connector 10 may be withdrawn from the mating connector 12 in a direction generally opposite the coupling direction. Once clear, the latch-lever 30 may be released. Accordingly, the initially contacting surface 26 of the latch body 18 may then cam against the exterior-facing surface of the latch-catch 22 and in effect push the connector 10 further out and away from the mating connector 12.

As should now be appreciated, by locating the latching surface 20 on the lateral side of the latch body 18 and by actuating the latch body 18 in the plane thereof (i.e. 'horizontally'), the latch body need not extend 'vertically' with respect to the main body to an appreciable extent. Accordingly, the connector 10 and the mating connector 12 may have a lower profile as compared to the situation where a connector has a 'vertically' actuated latch.

As shown in the drawings and as was discussed above, two of the connectors 10 may be mated into a pair 10*p*, in effect to form a duplex connector. As may be appreciated, each connector 10 in the pair 10*p* includes or is coupled to one or more cables 32 that generally extend from the main body 14 in a direction generally opposite the coupling direction. In one embodiment of the present invention, to define the pair 10*p* of connectors 10, a boot 34 is fitted over both cables 32 and at least a portion of each main body 14. In the pair 10*p*, each connector 10 may be dependent on or independent of each other, as was discussed above. If dependent, the boot 34 may be formed from a fairly rigid material such as a polyvinyl chloride (PVC). If independent, the boot 34 may be formed from a semi-rigid or non-rigid material such as SANTOPRENE thermoplastic rubber. Other boot materials may of course be employed without departing from the spirit and scope of the present invention.

In one embodiment of the present invention and in the duplex arrangement as shown, the latch bodies 18 and the latch levers 30 in the pair 10*p* of connectors 10 are all co-planar. In addition, the latch bodies 18 and the latch levers 30 in the pair 10*p* of connectors 10 are respectively arranged in mirror image with respect to each other along a line generally parallel to the coupling direction. In particular, such latch bodies 18 and latch levers 30 are arranged in mirror image such that the latch levers 30 are moved toward each other during de-coupling of the connectors 10 from the mating connectors 12, as is shown by the arrows D. Accordingly, both connectors 10 may be de-coupled from their respective mating connectors 12 merely by squeezing the latch levers together and toward each other, perhaps with two fingers. If, however, the release of only one connector 10 is desired, only the corresponding latch lever 30 need be actuated.

In one embodiment of the present invention, each latch body 18 and at least a portion of the respective main body 14 are formed as a unitary body. In a further embodiment, each latch lever 30, the respective latch body 18, the respective offset body 24, and at least a portion of the respective main body 14 are formed as a unitary body. The unitary body may be constructed from a material such as glass-filled nylon by a process such as a molding process. Of course, such elements may be separately formed, may be constructed from other materials, and may be formed by other processes, all without departing from the spirit and scope of the present invention.

As should now be understood, in the present invention, a latch body 18 for a connector 10 is 'horizontally' actuated. Accordingly, the connector 10 and its mating connector 12 can both have a relatively low profile. Changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

What is claimed is:

1. A connector for coupling with a mating component, the connector comprising:

a main body insertable into the mating component in a coupling direction, the main body having a face generally parallel to the coupling direction;

a generally planar latch coupled to the main body at the face thereof, the latch being generally parallel to the face and including a latching surface for cooperating with a latch-catch of the mating component and being resiliently actuatable in the plane thereof, thereby releasing the latching surface from the latch-catch of the mating component.

2. The pair of connectors of claim 1 further comprising a latch lever coupled to the latch and extending generally in the plane thereof to resiliently actuate such latch in the plane thereof.

3. The pair of connectors of claim 1 wherein the latch and at least a portion of the main body are formed as a unitary body.

4. The connector of claim 1 comprising an optical connector.

5. The connector of claim 1 further comprising an offset body interposed between the main body and the latch and offsetting the latch from the main body.

6. The connector of claim 1 wherein the latch includes a fixed leg coupled to the main body and an actuatable leg resiliently coupled to the fixed leg at a juncture, the latch surface being on a lateral edge of the actuatable leg.

7. The connector of claim 6 further comprising a latch lever coupled to the latch and extending generally in the plane thereof to resiliently actuate such latch in the plane thereof, the latch lever extending in a direction generally opposite the coupling direction from the actuatable leg of the latch.

8. The connector of claim 1 wherein the latching surface faces in a direction generally opposite the coupling direction.

9. The connector of claim 8 wherein the latch further comprises an initially contacting surface adjacent the latching surface and facing at an acute angle with respect to the coupling direction, the initially contacting surface initially contacting the mating component adjacent the latch-catch thereof during coupling of the connector with the mating component, such contact and movement of the connector in the coupling direction resiliently deflecting the latch to allow the latching surface to be brought into cooperating contact with the latch-catch.

10. The connector of claim 9 wherein the latch further comprises an opposing surface generally laterally opposite the latching surface and the initially contacting surface, the opposing surface for cooperating with a corresponding surface on the mating component.

11. A pair of connectors each for coupling with a respective mating component, each connector comprising:

a main body insertable into the mating component in a coupling direction, the main body having a face generally parallel to the coupling direction; and a generally planar latch coupled to the main body at the face thereof, the latch being generally parallel to the face and including a latching surface for cooperating with a latch-catch of the mating component and being resiliently actuatable in the plane thereof, thereby releasing the latching surface from the latch-catch of the mating component.

12. The pair of connectors of claim 11 each further comprising a cable extending from the main body in a direction generally opposite the coupling direction, the pair of connectors further comprising a boot fitted over both cables and at least a portion of each main body.

13. The pair of connectors of claim 11 wherein the boot is semi-rigid.

14. The pair of connectors of claim 11 wherein the latches are arranged in mirror image with respect to each other along a line generally parallel to the coupling direction.

15. The pair of connectors of claim 11 wherein the latches are generally co-planar.

16. The pair of connectors of claim 15 each further comprising a latch lever coupled to the respective latch and extending generally in the plane thereof to resiliently actuate such latch in the plane thereof, the latch levers being actuatable toward each other to release the latching surfaces from the latch-catches of the respective mating components.

17. The pair of connectors of claim 11 each further comprising a latch lever coupled to the respective latch and extending generally in the plane thereof to resiliently actuate such latch in the plane thereof.

18. The pair of connectors of claim 11 wherein each latch and at least a portion of the respective main body are formed as a unitary body.

19. The pair of connectors of claim 11 comprising a pair of optical connectors.

20. The pair of connectors of claim 11 each further comprising an offset body interposed between the main body and the latch and offsetting the latch from the main body.

21. The pair of connectors of claim 11 wherein each latch includes a fixed leg coupled to the main body and an actuatable leg resiliently coupled to the fixed leg at a juncture, the latch surface being on a lateral edge of the actuatable leg.

22. The pair of connectors of claim 21 each further comprising a latch lever coupled to the respective latch and extending generally in the plane thereof to resiliently actuate such latch in the plane thereof, each latch lever extending in a direction generally opposite the coupling direction from the actuatable leg of the respective latch.

23. The pair of connectors of claim 11 wherein each latching surface faces in a direction generally opposite the coupling direction.

24. The pair of connectors of claim 23 wherein each latch further comprises an initially contacting surface adjacent the respective latching surface and facing at an acute angle with respect to the coupling direction, the initially contacting surface initially contacting the respective mating component adjacent the latch-catch thereof during coupling of the respective connector with such mating component, such contact and movement of such connector in the coupling direction resiliently deflecting such latch to allow such latching surface to be brought into cooperating contact with such latch-catch.

25. The pair of connectors of claim 24 wherein each latch further comprises an opposing surface generally laterally opposite the respective latching surface and the respective initially contacting surface, the opposing surface for cooperating with a corresponding surface on the respective mating component to oppose deflecting forces experienced by the latch during resilient deflection thereof.

26. An optical connector comprising:

a housing;

a plurality of optical fibers defining a plane;

a latch mounted to the housing for securing the connector to a mating connector, the latch being actuatable in a direction generally parallel to the defined plane to engage with and release from a corresponding structure of the mating component.

27. The connector of claim 26 wherein the latch is actuatable in an actuation plane offset from the defined plane.

* * * * *